United States Patent [19]

Sunderland

[11] 3,772,514

[45] Nov. 13, 1973

[54] ISOLATION AMPLIFIER
[75] Inventor: John C. Sunderland, New York, N.Y.
[73] Assignee: Capintec, Inc., Mount Vernon, N.Y.
[22] Filed: Nov. 8, 1971
[21] Appl. No.: 196,280

[52] U.S. Cl. ............. 250/217 S, 250/208, 250/227
[51] Int. Cl. ............................................. G02f 1/28
[58] Field of Search................. 250/205, 208, 209, 250/217 SS, 217 S, 227, 217 R

[56] References Cited
UNITED STATES PATENTS
| | | | |
|---|---|---|---|
| 3,524,986 | 8/1970 | Harnden, Jr. | 250/217 X |
| 3,629,590 | 12/1971 | Case | 250/208 |
| 3,215,843 | 11/1965 | Neil | 250/217 X |
| 3,518,437 | 6/1970 | Riggs | 250/227 X |

OTHER PUBLICATIONS
Schoonover et al.: IBM Technical Disclosure Bulletin, Vol. 8; No. 8. Jan. 1966; pp. 1087, 1088.

Primary Examiner—Walter Stolwein
Attorney—Fleit, Gipple & Jocobson

[57] ABSTRACT

A DC isolation amplifier for transmitting DC analog voltages between two systems while maintaining DC and AC isolation therebetween. A current proportional to the DC input voltage is passed through a light-emitting diode whose light output is proportional to its input current. The output from the light-emitting diode is fed in approximately equal amounts and via a light pipe array, to a pair of matched light sensitive diodes. The electrical output from one of the light sensitive diodes provides feedback to the light driving circuitry, while the electrical output from the other is used to develop the signal output of the isolation amplifier.

21 Claims, 3 Drawing Figures

INVENTOR
JOHN C. SUNDERLAND

INVENTOR
JOHN C. SUNDERLAND

ISOLATION AMPLIFIER

BACKGROUND OF THE INVENTION

Anomolous electrical information resulting from ground current, ground loops, line voltage fluctuations, and the like, have posed problems to all users of electrical and electronic equipment. At the least, such anomolous electrical information results in erroneous measurement, control, etc. But at the worst, such results in the destruction of the measuring or control equipment, the destruction of the equipment being measured or controlled, or the destruction of living preparations under test. These problems can generally be thought of as resulting from the need for DC isolation, and frequently appear in four major areas.

First, DC isolation is extremely important when measurements are made on delicate systems. Ground currents flowing through such delicate systems can alter the quantity under measurement, and in some cases can even destroy the system under measurement. Recordings from living preparations are particularly sensitive to ground currents. Electrical stimulation of living preparations is similarly sensitive to ground currents. In extreme cases, the living preparation can be destroyed. Ground currents can easily be fatal to a patient who is receiving stimulation from or being monitored by body-implanted electrodes.

The second major area wherein DC isolation is important is when making measurements of small electrical signals. Ground currents give rise to voltage drops in ground leads and hence yield measurement error. And ground currents deriving from power line voltages give rise to hum and interference noise. Without DC isolation, these small disturbances are often very significant in the ultimate measurement.

Next, DC isolation is important in measurement and control systems having a number of transducers and actuators. Interconnected systems, particularly if the interconnections are varied, can have an ill defined zero reference level. This is often the result of the existence of ground currents. Measurement errors, actuator output errors, hum and so forth, can all result from such a varying zero reference level.

The fourth major area wherein DC isolation is an important consideration relates to the control systems in high power installations. The AC power grounds in large factories or laboratories are rarely at the same voltage level. It is therefore difficult to find a uniform zero voltage reference level at which measurements, control operations, and the like can be made. Customarily, when operating with small control voltages, sensors and activators are grounded only at the common control nd recording chassis, and are isolated from the remote ground reference points. Such a requirement can be expensive and difficult to achieve without a specific electrical isolation circuit.

A second general class of need for electrical isolation is related to control and measurement at points maintained at non-zero DC or AC voltages, particularly at high voltages. A typical example would be measurement of current via a shunt in the hot lead of a magnet power supply. Such a measurement of actual output current permits regulation of the supply to achieve a desired constant output current.

In the area briefly outlined above, it is conventional to use magnetic amplifiers, magamps, to provide the required AC and DC isolation between two systems. While these magnetic amplifiers are useful, they are relatively cumbersome, have a tendency to be unreliable, often have significant leakage currents, and are quite expensive. In addition, the conventional magnetic amplifier tends to have poor linearity and bandwidth responses.

There are known optical isolators consisting of two circuits coupled only by a light pathway. The first of these circuits, the input circuit, is a linear voltage to light converter. It may take the form of a light emitting diode, driven by a voltage to current converter consisting of an operational amplifier and associated gain determining resistors. The direct output of the operational amplifier is a voltage related to the input voltage by the ratio of the gain determining resistors. This voltage is converted into a current to drive the light emitting diode, the light output of which diode is approximately linear in the current passed therethrough. Thus, the input circuit delivers a light output from the light emitting diode proportional to the signal input voltage, the proportionality being approximately linear. This circuit can also be refined to deliver arbitrary linearity in its voltage to current relationship, cannot improve on the inherent non-linearities of the current to light relationship of the light emitting diodes. The input circuit is coupled to the second or output circuit by a light pathway and no other connection whatsoever. Thus, electrical isolation is perfect, except for bulk and surface leakages of the optical coupling material, of the circuit packaging material, and except for the capacitance of the optical coupler and the package.

The output circuit is a linear light to voltage converter. It consists of a light receiving diode feeding another operational amplifier with a feedback resistor. The light receiving diode has a linear relationship between light input and output current. This current is converted by the second operational amplifier to an output voltage related linearly thereto with constant of proportionality being determined by the value of an associated resistor. Thus, the output circuit serves as a linear light to voltage converter, which by suitable circuit refinements may be made arbitrarily precise. Thus, the combination of the input and output circuits coupled together solely by a light pathway serve as a linear voltage to voltage converter with arbitrarily good linearity and arbitrarily good electrical isolation, limited only by the inherent non-linearities of the light-emitting and light-sensitive diodes.

There are, however, still other practical considerations relating to achieving good linearity and stability. In practice, the two light sensitive diodes have substantial temperature coefficients. That is, change in temperature, due for example to change in ambient temperature or to change in power dissipation in the diodes themselves, changes the current to light relationships. Also, departures from linearity in current to light relationships can be significant. Although compensation for non-linearity and temperature coefficients may be achieved with appropriately sophisticated circuits matched to each diode, such circuits tend not to be economical.

It is toward the elimination of the drawbacks noted above, that the present invention is directed.

SUMMARY OF THE INVENTION

The present invention relates to an isolation amplifier for transmitting DC analog voltages between two systems with good linearity, stability and bandwidth responses, and while maintaining complete DC and AC isolation between these systems. The basic principle of operation of the inventive isolation amplifier relates to the electrically isolated interaction of a light-emitting diode and a pair of matched light sensitive diodes. A current derived from the DC analog voltage from one system is passed through the light-emitting diode, the output of which is optically coupled to a split light pipe array dividing the output illumination from the light-emitting diode into two substantially equal strength light signals. The light output from the light-emitting diode is then transmitted to and is impressed upon a pair of matched light sensitive diodes. The electrical output from one of the light sensitive diodes is amplified and forms the isolated output signal of the inventive amplifier; and the electrical output from the other light sensitive diode is used as a feedback signal which is compared with the input signal and used to generate an error signal for enhancing the linearity and stability of the device.

The inventive circuit resembles the known circuit described in the Background of the Invention section in that it has an input circuit optically coupled to an output circuit, namely a linear current to light converter. However, a second identical output circuit, also optically coupled to the same input circuit is added to achieve feedback linearization and stabilization. The feedback loop is extended to include the matched second output circuit in the inventive circuit. Thus, instead of feedback stabilizing only the input voltage to light emitting diode drive current relationship in the input circuit, and depending on the linearity and stability of the light emitting diode and light sensitive diodes to achieve total device linearity and stability, the feedback stabilization and linearization loop is operated on the total device input voltage to output voltage transfer relationship. The linearity and stability of the input circuit design is no longer critical, nor is the linearity and stability of the output circuit design. The total device feedback can achieve arbitrary linearity and stability insofar as the two matched output circuits are identical in all relevant parameters. Thus, relatively crude input and output circuits can be used as long as appropriate matching of the two output circuits is achieved. And with the inventive circuit, the light sensitive diode can be connected directly into the summing node of the first operational amplifier, thus significantly simplifying the circuit configuration.

The improved optical isolator has two substantial benefits not heretofore achievable by known devices. First, the inventive principle is not limited to a single optically isolated output from a given input. One input circuit can be coupled via light pathways to an arbitrary number of independent electrically isolated output circuits. Although each of these output circuits can be made to be identical, they can be made to have different transfer functions, with respect to, for example, gain, frequency characteristics, and incorporation of non-linearities. Second, the use of total device feedback results in a substantial improvement of linearity of the input voltage to light output of the input circuit. The optically fedback input circuit results in optically fedback light source. In fact, to the extent that the light sensitive diode is linear and stable, the input circuit with optical feedback is a fedback light source. It should be noted that over practical operating ranges, the light sensitive diodes currently available are much more linear and stable than the light emitting diodes. Thus, the optically fedback light source has good linearity and stability in its voltage to light transfer characteristic. But the total device stability and linearity is even better due to the match of the light receiving diodes and of the circuits associating therewith.

With the arrangement as described above, the inventive isolation amplifier offers complete electrical isolation between the two systems to be isolated. There is no electrical interaction whatsoever across a light path. In the realization of the inventive optical isolator, there are only infinitesimal leakage currents through the surface and bulk leakages of the optical light pipe and device package material. With the light sensitive diodes matched, and with the output of one being used to develop a feedback signal, the linearity of the inventive isolation amplifier is excellent, but limited only by the mismatch of the diodes and the feedback reserve gain. The response of each light sensitive diode may vary with temperature, with bias conditions, and so forth, but excellent linearity is still a feature of the inventive system as long as the non-linearities and other relevant parameters such as temperature coefficient of the two light sensitive diodes are matched. One almost linear diode develops the output signal, while the other almost linear diode controls the drive signal to the light emitting diode to compensate its small non-linearities and its temperature coefficient.

Accordingly, it is the main object of the present invention to provide an isolation amplifier for transmitting DC analog voltages between two systems, with substantially complete isolation and with excellent linearity, stability, and bandwidth responses.

It is a further object of the present invention to provide an isolation amplifier which is simple in design, relatively inexpensive, rugged and yet compact.

Still another object of the present invention is to provide an isolation amplifier wherein the elements thereof may be non-linear but which amplifier still provides linear response.

Still another object of the present invention is to provide an isolation amplifier wherein the elements thereof may have significant temperature coefficients but which amplifier still develops a response stable against temperature variations.

It is another object of the present invention to provide a linear isolation amplifier having a pair of light-sensitive diodes matched in non-linearities serving, respectively, for developing feedback and output signals.

Yet a further object of the present invention is to provide an isolation amplifier employing a light-emitting diode and a pair of light-sensitive diodes, one light-sensitive diode being used to develop feedback signals, and the other to develop the output for the amplifier.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figure 1:
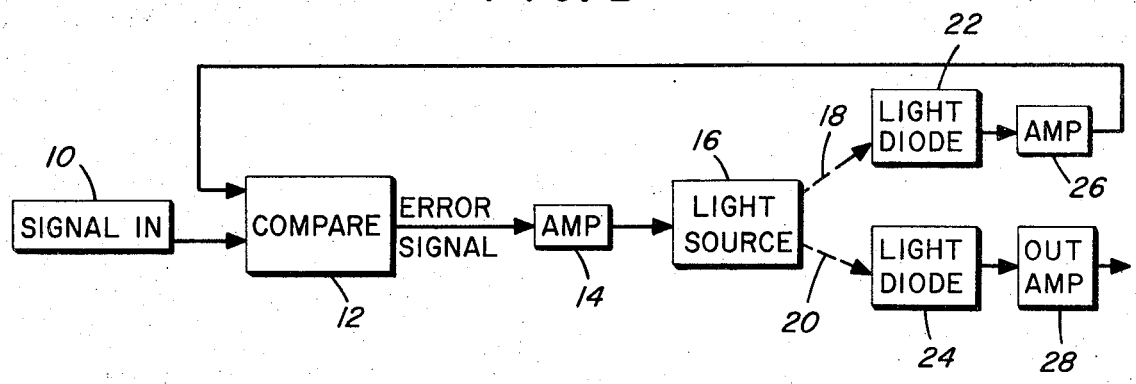
FIG. 1 is a block diagram of the inventive isolation amplifier.

With reference first to FIG. 1, the general operation of the inventive isolation amplifier will be described. The input signal is introduced to the inventive isolation amplifier as indicated at 10. The input signal is fed to a proportional comparator 12 the output of which is amplified by means of an ultra-high gain amplifier 14. The signal developed at the output of amplifier 14 is then impressed across the biasing terminals of a light source 16 the developed illumination of which is proportional to its excitation signal. The light output from the source 16 impinges upon a pair of matched light pipes 18 and 20, which light pipes carry substantially equal quantities of light to first and second light sensitive diodes 22 and 24, respectively.

The light sensitive diodes 22 and 24 each convert the input illumination received from the light source 16 into electrical signals, the amplitudes of which signals are proportional to the intensity of the light input. The electrical output of the light sensitive diode 22 is fed to an amplifier 26; and the electrical output from the light sensitive diodes 24 is fed to an amplifier 28. The resultant signal emergent from the amplifier 26 is returned to the comparator 12 where it is compared with the input signal introduced to the system at 10. If the amplified output from the light sensitive diode 22 is different from the input signal 10, the output of the comparator is an error signal which when amplified serves to adjust the drive to the light source in such a way as to result in an exact match of the output from the amplifier 26 to the signal input 10.

It is clear that in the limit of an infinite gain amplifier 14, combined with a perfect proportional differential comparator 12 (this combination being referred to as an operational amplifier), a perfect comparison of the output of the amplifier 26 to the signal input 10 will be achieved independent the exact gain and linearity of amplifier 14, linearity of light source 16, linearity of light sensitive diode 22 and gain and linearity of amplifier 26. If light sensitive diode 24 is exactly matched in all relevant parameters to light sensitive diode 22 (even if both are non-linear and have temperature dependent sensitivities) and amplifier 28 is exactly matched in all relevant parameters to amplifier 26, the output of amplifier 28 will be an exact duplicate of the signal input 10.

This technique permits utilization of economical components in a simple circuit while ensuring substantially perfect linearity in the system. For example, any non-linearity or temperature dependence of sensitivity in the light sensitive diode output 24 is accounted for by the development of an error signal in the light sensitive feedback diode 22 having identical non-linearities or temperature dependence of sensitivity, respectively.

Figure 2:
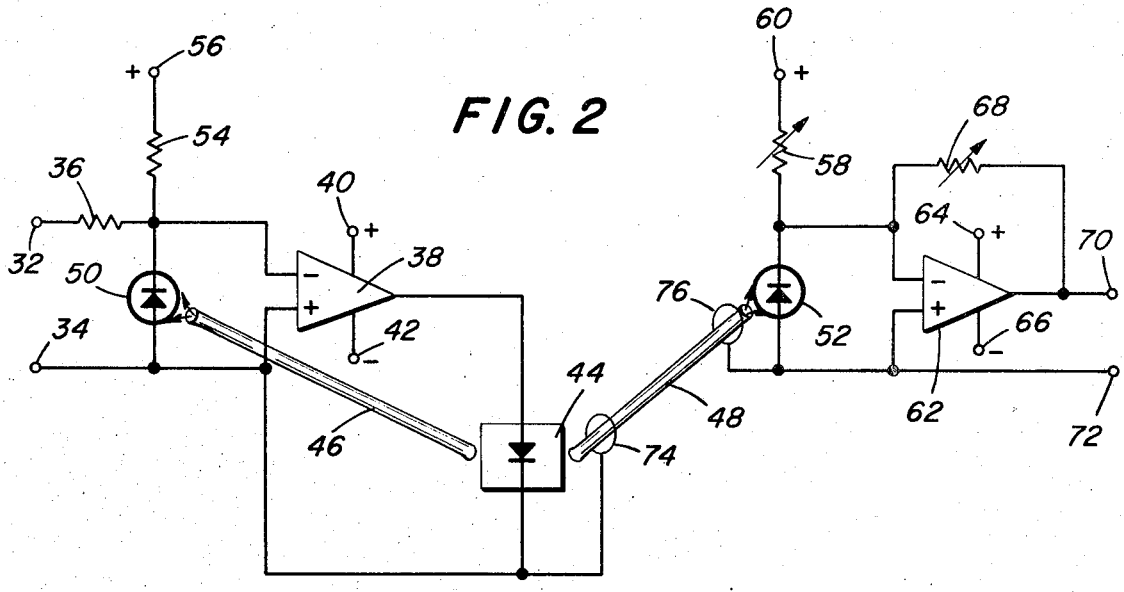
FIG. 2 is a simple schematic of the inventive isolation amplifier.

With reference now to FIG. 2, there will be given a description of a simplified schematic in the inventive isolation amplifier. Whereas the circuit depicted in FIG. 1 employs voltage feedback and comparison, the circuit depicted in FIG. 2 employs current feedback and comparison. The input signal is impressed across input terminals 32 and 34. The input signal causes a current to flow through input resistor 36 to the summing node of an operational amplifier 38. The operational amplifier 38 is powered by a source of positive potential developed at terminal 40 and by a source of negative potential developed at terminal 42. The output signal of the operational amplifier 38 excites a light-emitting diode 44 connected between the output of the operational amplifier 38 and the input ground.

In response to the excitation signal from operational amplifier 38, and proportional therewith, light-emitting diode 44 emits a quantity of light. The light from diode 44 is divided into two substantially equal quantities and is fed, by means of light pipes 46 and 48, respectively, to light sensitive diodes 50 and 52. Light pipe 46 carries its light from the light emitting diode 44 to the light sensitive diode 50, while light pipe 48 carries the same quantity of light from the light emitting diode 44 to the second light sensitive diode 52. As noted hereinabove, diodes 50 and 52 are matched.

Light sensitive diode 50 is connected to the summing node of operational amplifier 38, together with biasing resistor 54 which is connected to a source of positive potential developed at terminal 56. Diode 50 generates an electrical current proportional to its excitation illumination in turn generated by diode 44. In this manner, the current desired from the input signal impressed across terminals 32 and 34 is added to the current developed by the light sensitive diode 50. The polarities are opposite so as to achieve a comparator or differencing effect. The composite signal is, in turn, fed into the inverting input terminal of the operational amplifier 38.

The second operational amplifier 62 is biased through a variable biasing resistor 58 associated with a source of positive potential introduced at terminal 60 and fed into its summing node. The electrical output current from the light sensitive diode 52 is fed into the summing node of operational amplifier 62. Amplifier 62 is powering a source of positive potential through terminal 64 and negative potential through terminal 66. A variable feedback resistor 68 bridges the operational amplifier 62 and serves to adjust the output gain of the inventive circuit. The output from the operational amplifier 62 forms the output of the inventive isolation amplifier and is extracted at terminals 70 and 72.

To achieve the isolation between the input and output section of the inventive isolation amplifier, the sections containing the respective diodes 50 and 52, the power to each section of the circuit is developed from its own isolated power supply. In this manner, isolation is limited only by surface and bulk leakage and by the capitance of the packaging and optical coupling material. As an optional feature, and to ensure proper isolation in relatively high voltage systems, above a few hundred volts, conducting guard rings 74 and 76 are provided around the light pipe 48. Rings 74 and 76 are connected to the appropriate grounds to prevent surface and other leakage currents deriving from the light pipe 48 entering diodes 52 or the operational amplifier 62, and thereby resulting in possible erroneous outputs.

Figure 3:
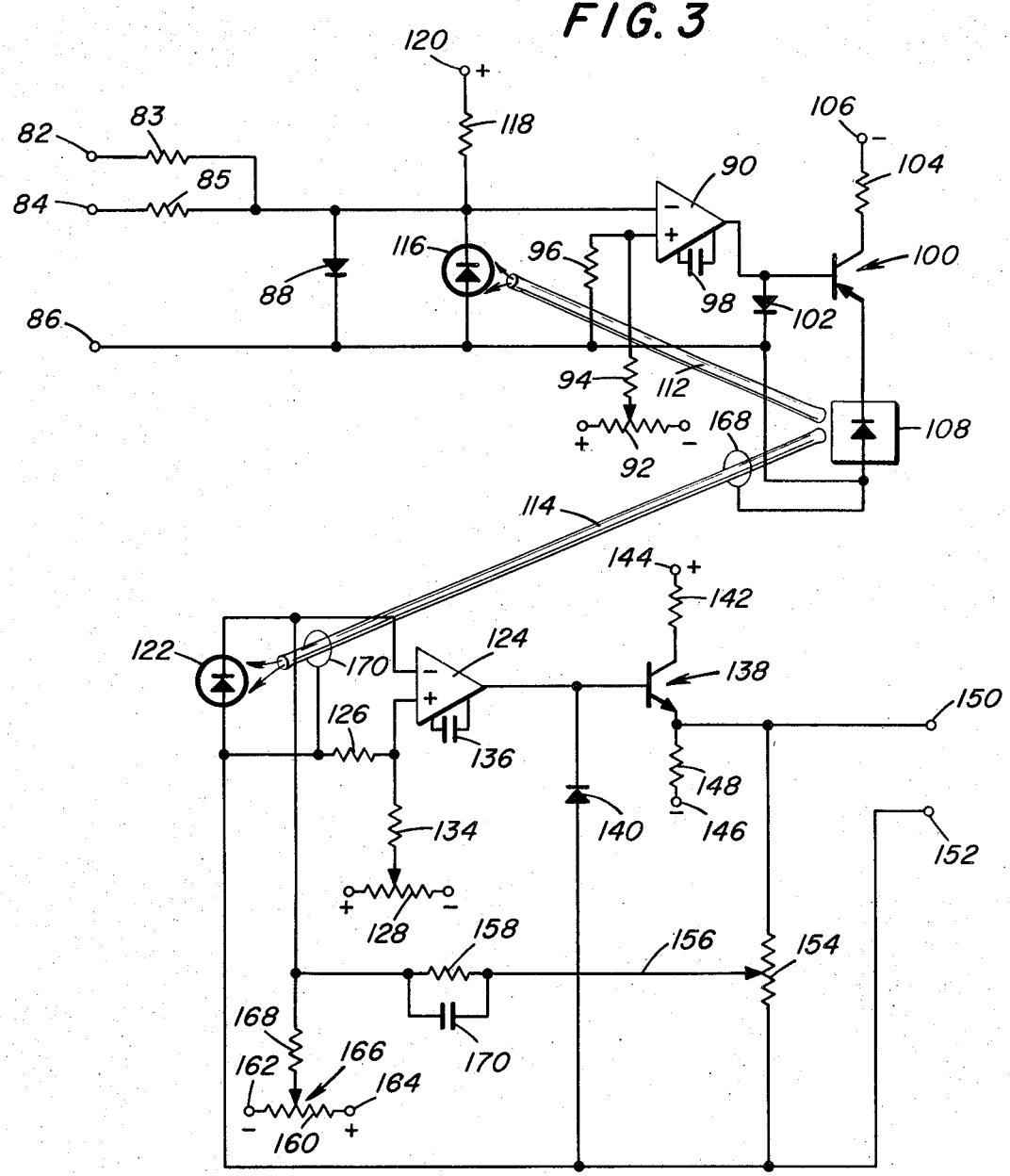
FIG. 3 is a detailed schematic of the isolation amplifier forming a part of the present invention.

As noted previously, variable resistor 68 serves as a gain adjusting resistor operating on the overall gain of the isolation amplifier. A second variable resistor 58 serves as a DC zero adjusting resistor. With the system fully operative, and with no input signal impressed across input terminals 32 and 34, resistor 58 is adjusted so that no signal appears across output terminals 70 and 72. Then, with a known input, the gain of the circuit is adjusted, by means of resistor 68, so that the output thereof reads true.

with reference now to FIG. 3, a detailed circuit schematic of the present invention will be described. The input signal to the circuit is introduced between high voltage input terminals 82 and 86 or between low voltage input terminals 84 and 86. A relatively large resistor 83 is in series with input terminal 82, and a relatively small resistor 85 is in series with input terminal 84. Input terminal 86 is connected to the input system ground and diode 88 is connected across the input of operational amplifier 90 to protect it against reverse overload voltages.

The input signal is fed to an operational amplifier 90 associated with a resistive network for performing a DC zero offset balance (normally a factory adjustment) on the amplifier 90. This balancing network takes the form of a variable resistor 92 connected across a source of potential and having a wiper arm 94 connected to a voltage divider comprised of resistors 94 and 96. The divided voltage at the junction of resistors 94 and 96 is connected to the positive input terminal of the operational amplifier 90. The operational amplifier 90 also associates with a compensating capacitor 98.

The output from the operational amplifier 90 is impressed across the base of a PNP transistor 100 protected from excessive reverse bias conditions by means of a diode 102. The transistor 100 is protected from overdissipation by resistor 104 associating with the collector of transistor 100 and a source of negative potential developed at terminal 106. The signal from the operational amplifier 90 is amplified by means of transistor 100 and exictes a light emitting diode 108.

Upon excitation, light emitting diode 108 illuminates a pair of matched light pipes 112 and 114 adapted to carry substantially equal quantities of light. The light output from light pipe 112 impinges upon a light sensitive diode 116 which issues an electrical signal proportional to the light excitation thereon. This electrical signal current is combined with the current deriving from the input signal at the summing node of the operational amplifier 90. Diode 116 is biased through resistor 118 with a source of positive potential developed at terminal 120.

The light pipe 114, also associated with the light emitting diode 108, transmits a quantity of light equal to the quantity transmitted by light pipe 112, to the light sensitive diode 122. The light sensitive diode 122, in response to the light excitation from the light emitting diode 108, issues an electrical signal which is impressed across the input terminals of operational amplifier 124. The operational amplifier 124 associates with an offset voltage compensating network comprising voltage dividing resistors 126 and 134, variable resistor 128, connected across a source of potential having a wiper arm connected to resistor 134. The operational amplifier 124 is further provided with a compensating capacitor 136.

The output of the operational amplifier 124 is fed to a NPN transistor 138 protected against excessive reverse bias conditions by means of a diode 140 connected to the base thereof. The collector of transistor 138 is powered through a dissipation limiting resistor 142 by means of a positive source of biasing potential developed at terminal 144. The emitter of transistor 138 associates with a source of negative potential injected into the circuit through terminal 146 and acting through biasing resistor 148.

The isolated output of the inventive isolation amplifier is taken from the emitter of transistor 138 across output terminals 150 and 152. This output signal is adjusted in gain by means of the fixed feedback resistor 158 connected between the summing node of the operational amplifier 124 and the wiper 156 of the adjustable gain multiplying potentiometer 154. Feedback resistor 158 is associated with integrating capacitor 170 to achieve optimum pulse responses. Variable resistor 160, provided with negative potential at one terminal 162 and with positive potential at its other terminal 164 feeds a signal to the summing node of the operational amplifier 124 over resistor 168 and serves as a zero adjustment for the output signal by operation on the variable resistive wiper arm 166.

In operation, the circuit illustrated in FIG. 3 is substantially identical with the circuit illustrated in FIG. 2.

As noted previously, the input signal is impressed either across high voltage terminals 82 and 86 or across low voltage terminals 84 and 86. Terminal 82 is intended to be used for input signals between 0 and 5 volts and terminal 84 is intended to be used with signals between 0 and 100 milivolts; hence, resistor 83 is fifty times the value of resistor 85. As explained previously, the DC offset zero adjustments are customarily made at the factory. Therefore, only two adjustments need be made with the inventive circuit. The first is a zero setting adjustment to ensure that the output of the circuit is zero when there is no input thereto. This is accomplished by means of variable resistor 160 with its resistive wiper arm 166. The second is a gain adjustment carried out by means of the variable resistor 154 with its adjustable wiper arm 156.

As was the case with the circuit illustrated in FIG. 2, the circuit illustrated in FIG. 3 further includes conducting guard rings 168 and 170 associating with the respective ends of light pipe 114. The rings 168 and 170 are connected to the appropriate ground potentials and serve to ensure proper isolation between the input and output sections of the circuit. The circuit of FIG. 3 is also protected against voltage overloads in the input side thereof and is provided with overdissipation protection for its respective transistors.

Below are listed some typical values of the elements for the circuit illustrated in FIG. 3.

| Resistors in Ohms | | Capacitors in Picofarads | |
| --- | --- | --- | --- |
| Number | Value | Number | Value |
| 83 | 2 M | 98 | 15 |
| 85 | 40 K | 136 | 3.3 |
| 92, 128, 154 | 10 K | 170 | 10 |
| 160 | | | |
| 94, 134 | 270 K | Amplifiers 90 and 124 | |
| 104 | 150 | National Semiconductor Model LM 308 | |
| 118 | 20 M | Transistors 100 and 138 | |
| 96, 126 | 150 | General Electric Models D45C6 and D44C6 | |
| 148 | 1.5 K | Light Sensitive | |
| 158 | 1 Meg | Diodes 116 and 122 Sensor technology Special ½ CM × ½ CM | |
| 168 | 10 M | Light Emitting Diode 108 G.E. Model SSL-22 Diodes 88, 102, 140 IN 914 | |

Above, a specific embodiment of the present invention has been described. It should be appreciated, however, that this embodiment is described for purposes of ilustration only and that numerous alterations and modifications may be practiced by those skilled in the art without departing from the spirit and scope of the invention. Accordingly, it is the intent that the invention not be limited by the above but be limited only as defined in the appended claims.

What is claimed is:

1. An isolator for transmitting signals from one system to another, while maintaining electrical isolation therebetween, the isolator comprising: a pair of input terminals for receiving electrical input signals from one of said systems; light emission means for emitting a quantity of light proportional to the input signals received at said input terminals; first and second light transmission means for receiving and transmitting equal quantities of light from said light emission means; first light receiving means for receiving the light transmitted by said first light transmission means, and for converting the received light into electrical signals; means for comparing the input signals received at said input terminals with the signals generated by said first light receiving means; means for varying the light emitted by said light emission means so that the signals generated by said first light receiving means follow the input signals received at said input terminals, second light receiving means electrically isolated from said first light receiving means for receiving light transmitted by said second light transmission means, and for converting the received light into electrical signals which are directly proportional to the input signals received at said input terminals; a pair of output terminals for delivering electrical output signals to the other of said systems; and means for delivering the electrical signals developed by said second light receiving means to said pair of output terminals.

2. The isolator recited in claim 1, wherein said light emission means is a light emitting diode; wherein said first and second light receiving means are light sensitive diodes; and wherein said light transmission means are light pipes.

3. The isolator recited in claim 2, wherein the light pipe for transmitting light from the light emitting diode to the second light sensitive diode is provided with a first conducting ring surrounding its end adjacent said light emitting diode, said first conducting ring connected to the ground of the input system, and a second conducting ring surrounding its end adjacent said second light sensitive diode, said second conducting ring connected to the ground of the output system.

4. The isolator recited in claim 3, and further comprising means for ensuring that no electrical signals are developed at said pair of output terminals when no electrical signals are received by said pair of input terminals.

5. The isolator recited in claim 3, and further comprising means for adjusting the gain of said isolator so that the electrical signals delivered to said pair of output terminals are at all times equal to the electrical signals received at said pair of input terminals.

6. The isolator recited in claim 1, wherein said first and second light receiving means are matched in their nonlinearities.

7. An isolator for transmitting signals from one system to another, while maintaining electrical isolation therebetween, the isolator comprising: a pair of input terminals for receiving electrical input signals from one of said systems; light emission means for emitting a quantity of light proportional to the input signals received at said input terminals; first and second light transmission means for receiving and transmitting substantially equal quantities of light from said light emission means; first light receiving means for receiving the light transmitted by said first light transmission means, and for converting the received light into electrical signals for comparison with said electrical input signals; second light receiving means electrically isolated from said first light receiving means for receiving light transmitted by said second light transmission means, and for converting the received light into electrical signals which are directly proportional to the input signals received at said input terminals; a pair of output terminals for delivering electrical output signals to the other of said systems; and means for delivering the electrical signals developed by said second light receiving means to said pair of output terminals.

8. The isolator recited in claim 7, wherein the light emitted by said light emission means is dependent upon therethrough; and wherein said excitation signals vary in accordance with the differences between the input signals received at the input terminals and the signals generated by said first light receiving means.

9. The isolator recited in claim 7, wherein said light emission means is a light emitting diode; wherein said first and second light receiving means are light sensitive diodes; and wherein said light transmission means are light pipes.

10. The isolator recited in claim 9, wherein the light pipe for transmitting light from the light emitting diode to the second light sensitive diode is provided with a first conducting ring surrounding its end adjacent said light emitting diode, said first conducting ring being connected to the input ground terminal, and a second conducting ring surrounding its end adjacent said second light sensitive diode, said second conducting ring being connected to the output ground terminal.

11. The isolator recited in claim 7, and further comprising means for ensuring that no electrical signals are developed at said pair of output terminals when no electrical signals are received by said pair of input terminals.

12. The isolator recited in claim 7, and further comprising means for adjusting the gain of said isolator so that the electrical signals delivered to said pair of output terminals are at all times equal to the electrical signals received at said pair of input terminals.

13. The isolator recited in claim 7, wherein said first and second light receiving means are matched in their non-linearities.

14. An isolator for transmitting signals from one system to another, while maintaining electrical isolation therebetween, the isolator comprising: a pair of input terminals for receiving electrical input signals from one of said systems; light emission means for emitting a quantity of light proportional to the input signals received at said input terminals; first and second light transmission means for receiving and transmitting substantially equal quantities of light from said light emission means; first light receiving means for receiving the light transmitted by said first light transmission means, and for converting the received light into electrical feedback signals for said light emission means; second light receiving means electrically isolated from said first light receiving means for receiving light transmitted by said second light transmission means, and for converting the received light into electrical output signals which are directly proportional to the input signals received at said input terminals; means for developing electrical error signals responsive to said feedback signals and for adding such error signals to said electrical input signals, said error signals being of a magnitude so as to equalize said electrical output signals and said electrical input signals; and a pair of output terminals for delivering said electrical output signals to the other of said systems.

15. The isolator recited in claim 14, wherein said error signals are developed only when the signals delivered to the pair of output terminals are different from the signals received at the pair of input terminals.

16. The isolator recited in claim 15, wherein said error signals are proportional to the difference between the electrical signals received at said input terminals and the feedback signals generated by the first light receiving means.

17. The isolator recited in claim 14, wherein said light emission means is a light emitting diode; wherein said first and second light receiving means are light sensitive diodes; and wherein said light transmission means are light pipes.

18. The isolator recited in claim 17, wherein the light pipe for transmitting light from the light emitting diode to the second light sensitive diode is provided with a first conducting ring surrounding its end adjacent said light emitting diode, said first conducting ring being connected to the input ground terminal, and a second conducting ring surrounding its end adjacent said second light sensitive diode, said second conducting ring being connected to the output ground terminal.

19. The isolator recited in claim 14, and further comprising means for ensuring that no electrical signals are developed at said pair of output terminals when no electrical signals are received by said pair of input terminals.

20. The isolator recited in claim 14, and further comprising means for adjusting the gain of said isolator so that the electrical signals delivered to said pair of output terminals are at all times equal to the electrical signals received at said pair of input terminals.

21. The isolator recited in claim 14, wherein said first and second light receiving means are matched in their non-linearities.

* * * * *